United States Patent Office 2,890,228
Patented June 9, 1959

---

2,890,228

NEW POLYAMIDE LIKE CONDENSATION PRODUCTS AND PROCESS OF PRODUCING THE SAME

Wolfgang Curt Günter Förster, Sao Paulo, Brazil, assignor to Reichhold Chemicals, Inc., Detroit, Mich.

No Drawing. Application February 27, 1956
Serial No. 567,750

Claims priority, application Germany September 23, 1955

8 Claims. (Cl. 260—404.5)

The invention relates to new polyamide-like condensation products and to the process of producing the same.

Polyamides from dimerized and trimerized fatty acids and polyamines have for some time been known as raw materials that lend themselves, for example, to treatment not only as binding materials in themselves, but also in combination with other film-forming substances particularly by reaction with what are called epoxy resins to become valuable reaction lacquers. The production of the dimerized and polymerized fatty acids from soya bean oil or linseed oil, for example, by suitable treatment as through thermic polymerization of the corresponding oils or through catalytic polymerization of the corresponding mono-alcohol esters with borofluoride or the like, is relatively complicated and their dark color does not permit light-hued polyamide resins to be obtained.

It has now been found that it is possible to obtain valuable polyamide-like condensation products in an entirely different manner, which as compared with the above-mentioned polyamides possess marked advantages, since they may be prepared in a more economically feasible manner and the products are of lighter color.

In order to secure these novel substances unsaturated fatty acids which, in general, contain 11 to 22 carbon atoms or mixtures of unsaturated fatty acids, their esters, particularly the esters formed with relatively low boiling alcohols, are first converted in known manner into the epoxy compound. The boiling point of the corresponding alcohols is preferably not above 200° C. at atmospheric pressure. Preferably mixtures of unsaturated fatty acids are used such as are obtained, for example upon cleavage of natural unsaturated vegetable or animal fats or oils. Admixtures of saturated fatty acids or colophonic acids, found for example in tall oil, up to a certain degree are without significance. This epoxidation comes about with the use of the known reactions wherein, for example, for unsaturated fatty acid monoalcohol ester the procedure is according to German Patent No. 857,364, in which olefinic double compounds are converted through reaction with organic peracids or with mixtures of hydrogen peroxide and organic acids capable of forming peracids. In this case epoxy rings form with dissociation of the olefinic double compound. The monoepoxy or polyepoxy fatty acids or their esters originating in this way are then converted with aliphatic diamines or polyamines, for example ethylene diamine, diethylene triamine and the like, with heating, in which case with participation of the epoxy group and the carboxyl group or ester group for example with diethylene triamine approximately the following reaction occurs:

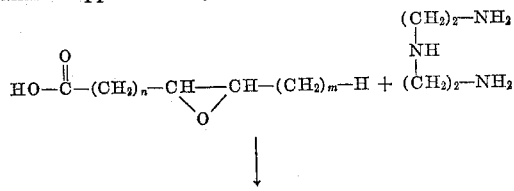

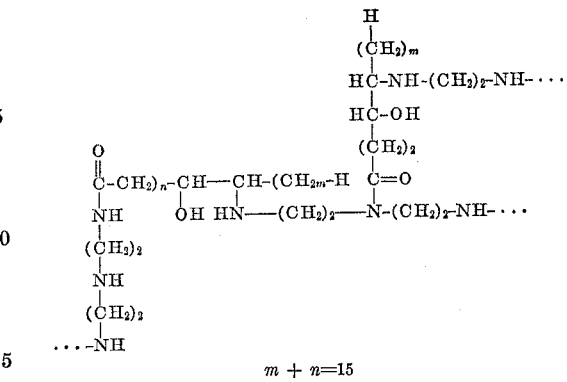

$m + n = 15$

Naturally in the event of the use of epoxy fatty acid esters as the amidization takes place the corresponding alcohol is split off instead of water. The foregoing equation outlines the formation of branched condensation products.

The invention will be more readily understood by reference to the accompanying specific examples, which are intended as illustrative only rather than as limiting the invention to the specific details set forth.

*Example I*

1010 gr. of linseed oil fatty acid, 79 gr. of formic acid (98%) and 600 gr. of hydrogen peroxide are mixed with cooling and are stirred at about 33° C. for a period of forty-eight hours. The epoxidized linseed oil fatty acid after treatment has an oxirane-oxygen content of approximately 4.2% (determined according to the method described in Ind. Engng. Chem., Analytical Edition, 19, 1947, p. 414/415).

500 gr. of a linseed oil fatty acid oxidized in this manner and 211.5 gr. of diethylene triamine are mixed and when this is done a slight heating is observed. This mixture is heated while an inert gas is run therethrough, for example nitrogen, for one hour at 140° C. with reflux, while the outlet temperature of the cooler is about 100° C. The temperature of the reaction mixture is maintained for two hours at 140° C. After this with a descending cooler, heating to 200° C. is carried out and this temperature is maintained for a period of an hour. After cooling with nitrogen a bland or soft resin is obtained in a yield of 650 gr. that is soluble in a mixture of toluol/i-propanol of 1:1.

*Example II*

Through epoxidation of soya bean fatty acid with hydrogen peroxide and formic acid with the same quantitative proportions and conditions of experimentation as in Example I a product is obtained with approximately 4.0% of oxirane-oxygen.

200 gr. of this epoxidized soya bean fatty acid is mixed with 32 gr. of diethylene triamine and as described in Example I is heated. A highly viscous resin is obtained in a yield of about 210 gr.

*Example III*

Soya bean oil is re-esterified with methanol with addition of a little potassium hydroxide. The formed methyl ester of the mixture from the soya bean fatty acids is washed with water free from alkali and glycerine and after that is purified through vacuum distillation (see Ind Engng. Chem. 32, 1940, p. 802/809).

400 gr. of such soya bean fatty acid methyl ester is stirred and treated in known manner with 215 gr. of a 35% hydrogen peroxide with addition of 34 gr. of a 98% formic acid for a period of forty-eight hours. The epoxidized soya bean fatty acid methyl ester after treatment has an oxirane-oxygen content of approximately 5%.

100 gr. of a soya bean fatty acid methyl ester epoxidized in such manner is mixed with 41.5 gr. of diethylene triamine and, as described in Example I, is heated for two hours to 140° C. and for one hour to 200° C. After cooling with nitrogen a slightly yellow colored resin is obtained. The yield is approximately 120 gr.

*Example IV*

100 gr. of epoxidized soya bean fatty acid methyl ester obtained according to the mode of operation of Example III, and 23 gr. of diethylene triamine are converted according to the process of Example I. The result is 110 gr. of a soft resin.

As computed from the foregoing examples the weight of the aliphatic polyamine added to the epoxidized ester is about one-sixth to two-fifths of the weight of the ester.

The invention has been described in detail for the purpose of illustration, but it will be obvious to those skilled in the art that numerous modifications and variations may be resorted to within the scope of the accompanying claims without departing from the spirit of the invention.

I claim:

1. A process for producing new resinous products which comprises epoxidizing at least one member of a group consisting of ethylenically unsaturated vegetable and animal fat acids and esters thereof with saturated aliphatic monohydric alcohols having a boiling point not above 200° C. and mixtures thereof to produce a product having an oxirane oxygen content of about 4%, adding about ⅙–⅖ of its weight an aliphatic polyamine represented by the formula R—NH—CH$_2$—CH$_2$—NH$_2$, where R is a member of the group consisting of H and —(CH$_2$CH$_2$NH$_2$), and then heating for about two hours at about 140° C. and subsequently heating at about 200° C. for about one hour.

2. A process as set forth in claim 1, wherein the fatty acids are of soya bean oil.

3. A process as set forth in claim 1, wherein the fatty acids are of linseed oil.

4. A process as set forth in claim 1, wherein the said ester is obtained by ester interchange of a vegetable oil and monohydric alcohol.

5. A process as set forth in claim 1, wherein the initial epoxidized product is condensed with ethylene diamine.

6. A process as set forth in claim 1, wherein the initial epoxidized product is condensed with diethylene triamine.

7. A process as set forth in claim 1, wherein the oxirane oxygen content of the epoxidized product is from 4 to 5%.

8. The product of the process of claim 1.

References Cited in the file of this patent

UNITED STATES PATENTS

| | | |
|---|---|---|
| 2,445,892 | Swern et al. | July 27, 1948 |
| 2,485,160 | Niederhauser et al. | Oct. 18, 1949 |
| 2,495,305 | Wyler | Jan. 24, 1950 |
| 2,518,148 | Jordan et al. | Aug. 8, 1950 |
| 2,585,115 | Greenlee | Feb. 12, 1952 |
| 2,682,514 | Newey | June 29, 1954 |
| 2,682,515 | Naps | June 29, 1954 |
| 2,761,870 | Payne et al. | Sept. 4, 1956 |
| 2,823,323 | De Groote et al. | Mar. 25, 1958 |

FOREIGN PATENTS

| | | |
|---|---|---|
| 737,697 | Great Britain | Sept. 28, 1955 |
| 133,819 | Australia | Aug. 10, 1949 |

OTHER REFERENCES

The Naming and Indexing of Chemical Compounds by Chemical Abstracts, p. 5923 (Introduction to the 1945 Subject Index), 1953.

Swern: Oxygenated Fatty Acids, pp. 213–217, reprinted from "Progress in the Chemistry of Fats and Other Lipids" (1955).